United States Patent
Launie et al.

(10) Patent No.: US 6,527,461 B2
(45) Date of Patent: Mar. 4, 2003

(54) LENS COVER ASSEMBLY FOR A FOLDING CAMERA

(75) Inventors: Kenneth J. Launie, Cambridge, MA (US); Robert L. Stephansky, Stoughton, MA (US)

(73) Assignee: Polaroid Corporation, Waltham, MA (US)

(*) Notice: Subject to any disclaimer, the term of this patent is extended or adjusted under 35 U.S.C. 154(b) by 0 days.

(21) Appl. No.: 09/950,179

(22) Filed: Sep. 10, 2001

(65) Prior Publication Data

US 2002/0071671 A1 Jun. 13, 2002

Related U.S. Application Data

(60) Provisional application No. 60/233,005, filed on Sep. 15, 2000.

(51) Int. Cl.[7] .............................................. G30B 17/04
(52) U.S. Cl. ...................................... 396/348; 396/448
(58) Field of Search ................................ 396/348, 350, 396/448, 30, 349

(56) References Cited

U.S. PATENT DOCUMENTS 4,601,561 A * 7/1986 Yamashita .................. 396/178
5,027,142 A * 6/1991 Douglas ....................... 396/33
6,055,374 A * 4/2000 Douglas ....................... 396/30

* cited by examiner

Primary Examiner—Russell Adams
Assistant Examiner—Michelle Nguyen

(57) ABSTRACT

A lens cover assembly for a folding camera includes a main frame assembly and a lens assembly pivotally mounted on the main frame assembly and movable between a closed position in which the lens assembly is disposed at least in part within the main frame assembly and an open position in which the lens assembly upstands from the main frame assembly, the lens assembly having a lens therein. A lens cover member is pivotally mounted on the lens assembly and is movable between a first position in which the lens cover member completely covers the lens, and a second position in which the lens cover member is removed from the lens. A mechanical linkage interconnects the main frame assembly and the lens cover member and is operative, upon moving the lens assembly from the closed position to the open position, to move the lens cover member to the second position, and further operative, upon moving the lens assembly from the open position to the closed position, to move the lens cover member to the first position.

16 Claims, 8 Drawing Sheets

LENS COVER ASSEMBLY FOR A FOLDING CAMERA

REFERENCE TO RELATED APPLICATION

This application claims the benefit of prior copending provisional application Ser. No. 60/233,005, filed Sep. 15, 2000.

BACKGROUND OF THE INVENTION

1. Field of the Invention

The invention relates to photographic cameras, and is directed more particularly to a lens cover assembly for a folding camera.

2. Description of the Prior Art

Folding cameras are well known. Such cameras conventionally include a main frame assembly and a lens assembly pivotally connected to the main frame assembly. The lens assembly is movable between a closed position in which the lens assembly is wholly or partly disposed in the main frame assembly, and an open position in which the lens assembly upstands from the main frame assembly. The lens assembly supports a camera lens and shutter mechanism and includes a bellows assembly, or the like, forming an exposure chamber. Typically, the lens is uncovered at all times, when the camera is in the open position for use and also when the camera is closed.

In some folding cameras, the lens assembly is provided with a lens cover, usually pivotally mounted on the lens assembly and manually movable between positions completely covering the lens and completely removed from the lens. Alternatively, the lens cover may be a simple screw-on or snap-on type of discrete cover.

While it has been found preferable to provide shielding for the lens, in practice when a lens cover is provided, an operator often neglects to remove the lens cover and starts a photographic exercise without realizing that the lens is covered.

Accordingly, there is a need for a cover assembly which automatically covers the lens when the lens assembly, and therefore the lens, is housed in the main frame assembly, and will automatically uncover the lens when the lens assembly is raised to an "open" position, upstanding from the main frame assembly, in anticipation of use of the camera.

SUMMARY OF THE INVENTION

An object of the invention is, therefore, to provide a lens cover assembly for a folding camera, the lens cover assembly being operative to automatically cover the lens when the camera is disposed in a closed condition and to uncover the lens when the camera is disposed in an open condition.

With the above and other objects in view, as will hereinafter appear, a feature of the present invention is the provision of a lens cover assembly for a folding camera having a main frame assembly and a lens assembly pivotally mounted on the main frame assembly and movable between a closed position in which the lens assembly is disposed at least in part within the main frame assembly and an open position in which the lens assembly upstands from the main frame assembly, the lens assembly having a lens therein. The lens cover assembly comprises a lens cover member pivotally mounted on the lens assembly and movable between a first position in which the lens cover member completely covers the lens, and a second position in which the lens cover member is removed from the lens. The lens cover assembly further comprises a mechanical linkage which interconnects the main frame assembly and the lens cover member and is operative, upon moving the lens assembly from the closed position to the open position, to move the lens cover member to the second position, and further operative, upon moving the lens assembly from the open position to the closed position, to move the lens cover member to the first position.

In accordance with a further feature of the invention, there is provided a lens cover assembly for a folding camera having a main frame assembly and a lens assembly pivotally mounted on the main frame assembly and movable thereon between a closed position in which the lens assembly is disposed at least in part in the main frame assembly and an open position in which the lens assembly upstands from the main frame assembly, the lens assembly having a lens therein. The lens cover assembly includes a lens cover member mounted on the lens assembly and movable between a first position in which the lens cover member completely covers the lens, and a second position in which the lens cover member is removed from the lens. The lens cover assembly further includes a lens cover member moving means disposed at least in part on the lens assembly and at least in part on the main frame assembly and operative, upon moving the lens assembly from the closed position to the open position, to move the lens cover member from the first position to the second position, and operative, upon moving the lens assembly from the open position to the closed position, to move the lens cover member from the second position to the first position.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

DESCRIPTION OF THE PREFERRED EMBODIMENT

Figures 1, 2:
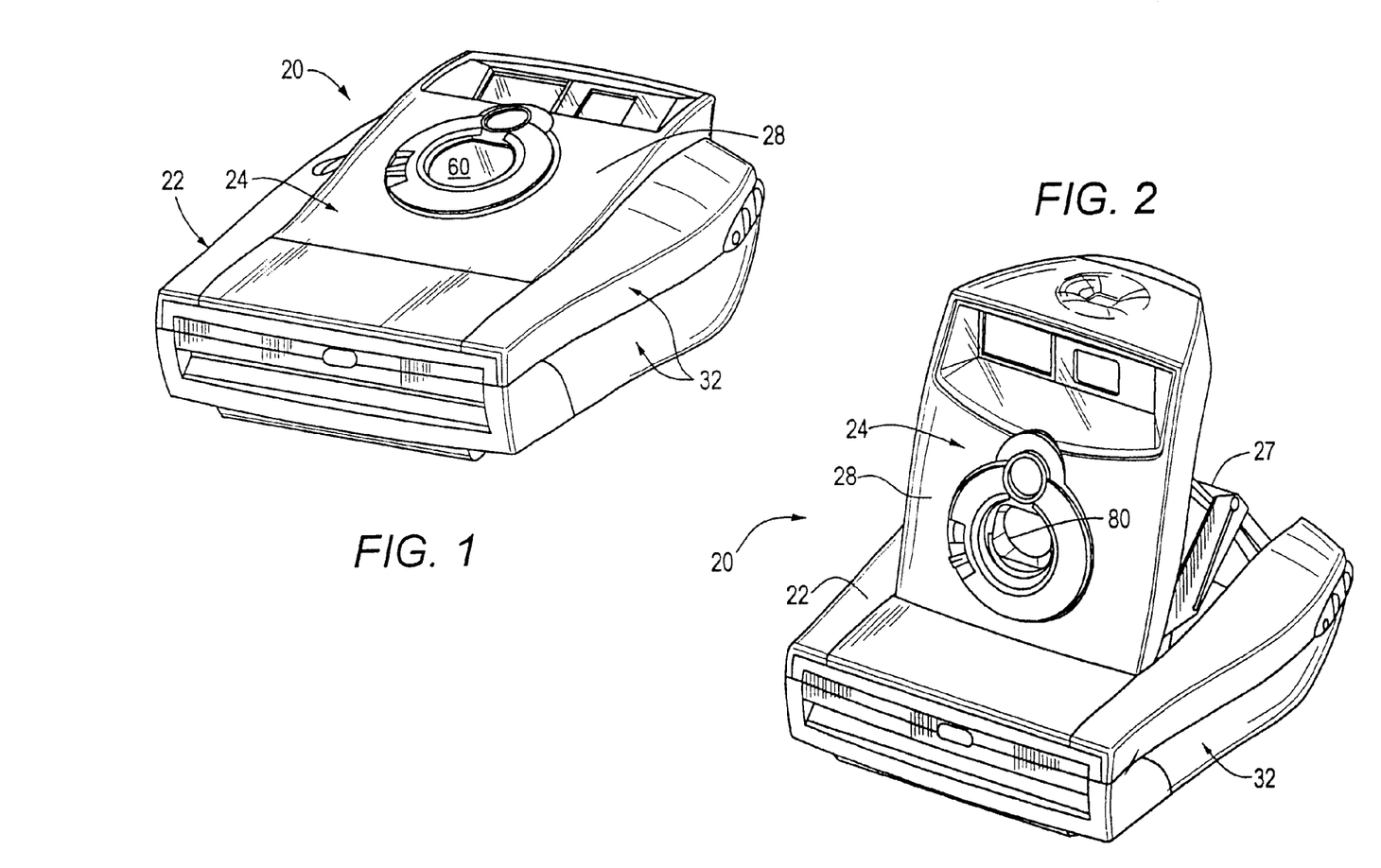
FIG. 1 is a perspective view of one form of camera in which the invention finds utility, the camera being shown in a "closed" condition.
FIG. 2 is similar to FIG. 1, but illustrates the camera in an "open" condition.

Referring to FIGS. 1 and 2, it will be seen that a folding camera 20 includes a main frame assembly 22 on which is mounted a lens assembly 24. The lens assembly 24 is movable on the main frame assembly 22 between the "closed" position shown in FIG. 1 and an "open" position shown in FIG. 2. In the closed position, the lens assembly 24 is in part disposed in the main frame assembly 22. In the open position, the lens assembly 24 upstands from the main frame assembly 22. The camera 20 customarily is placed in the closed position when not in use, and must be placed in the open position for use.

Figure 3:
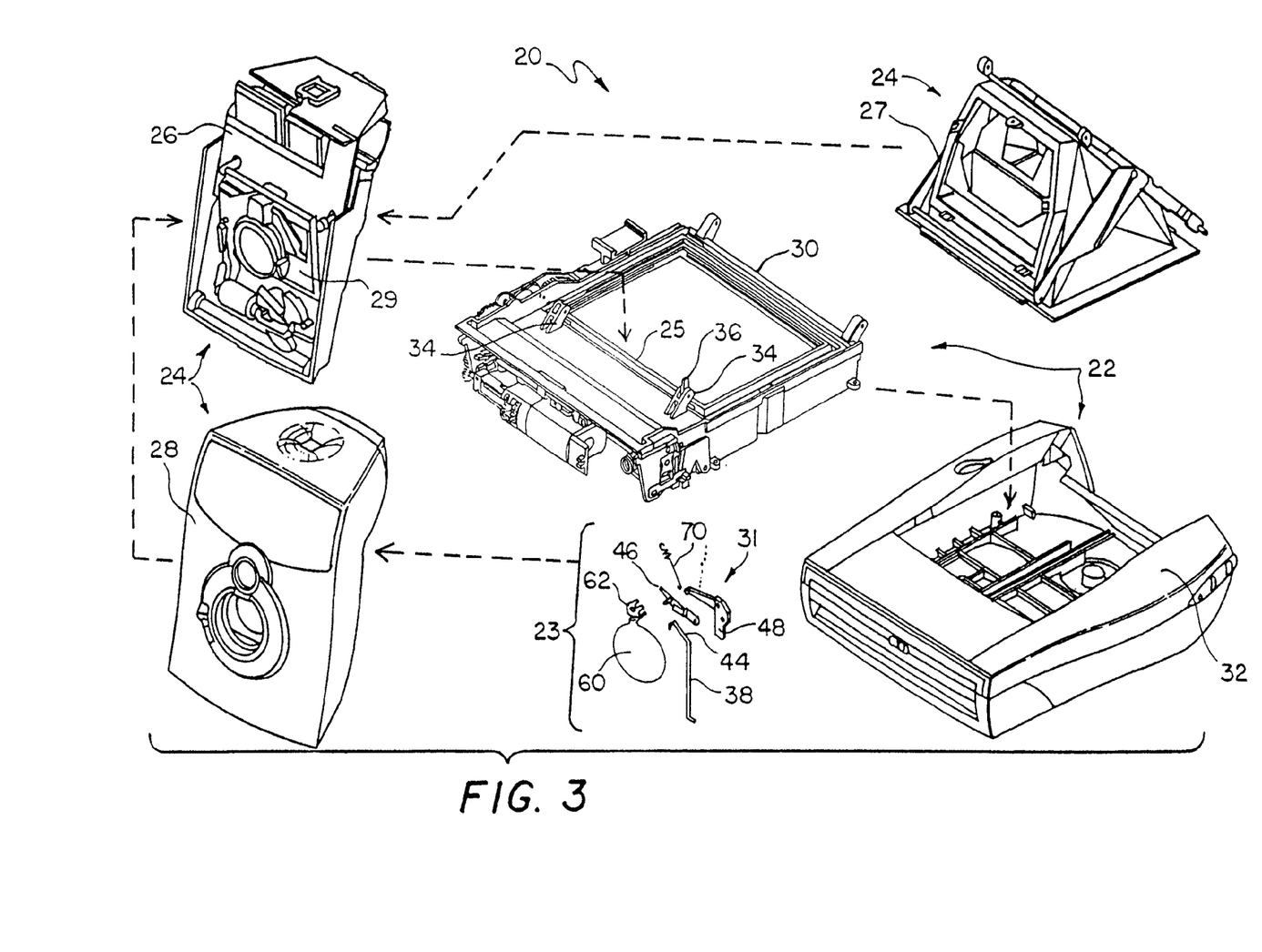
FIG. 3 is an exploded view of the camera, showing major components thereof and components of an illustrative embodiment of the invention.

Referring to FIG. 3, it will be seen that the lens assembly 24 includes a base link 26, which is pivotally mounted on a main frame member 30 of the main frame assembly 22 (FIGS. 4–6) and a front cover 28 (FIGS. 1–3) which is fixed onto the base link 26 and covers a lens and shutter unit 29. Mounted in the front cover 28 is a lens cover assembly 23, including a mechanical linkage 31, described hereinbelow. The lens assembly 24 further includes a bellows assembly 27, or the like, in which film (not shown) is exposed.

Still referring to FIG. 3, it will be seen that the main frame assembly 22 includes the main frame member 30 and a main frame cover member 32 mounted thereon.

Figure 4:
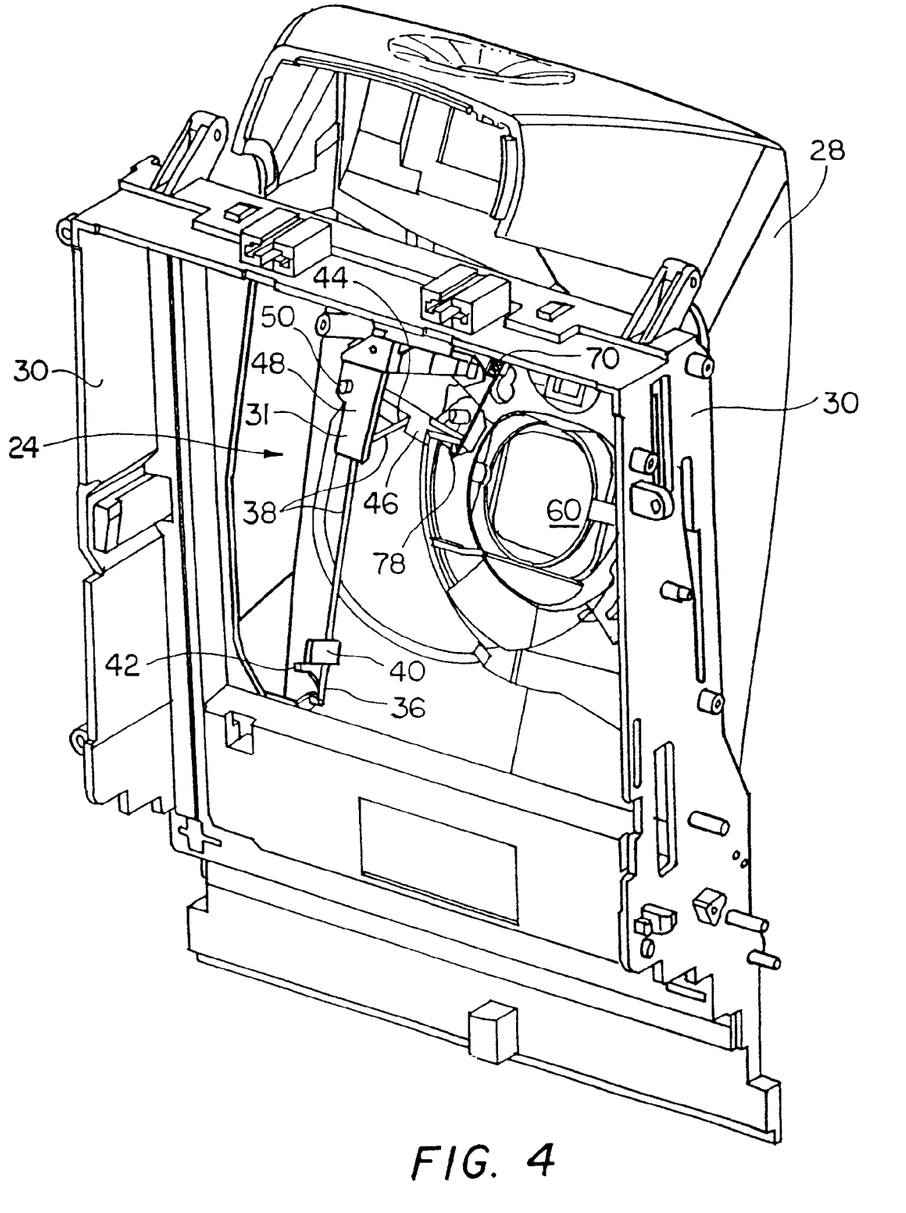
FIG. 4 is a perspective, generally bottom view of main frame and front cover portions of the camera in the closed condition, and showing the mechanical linkage and lens cover of the inventive lens cover assembly.
Figure 5:
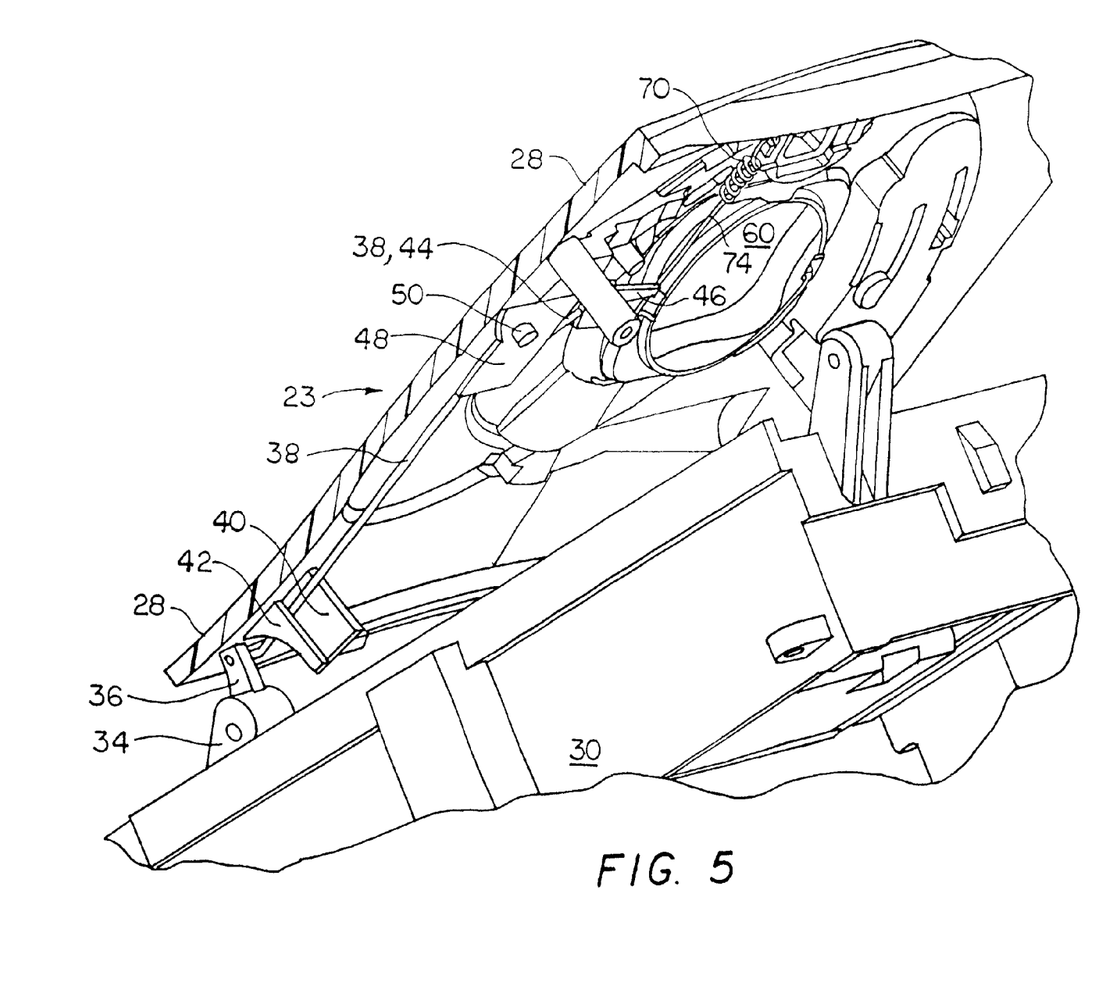
FIG. 5 is a further perspective view, partly in section, of main frame and front cover portions of the camera in the closed condition, and showing the lens cover assembly.
Figure 8:
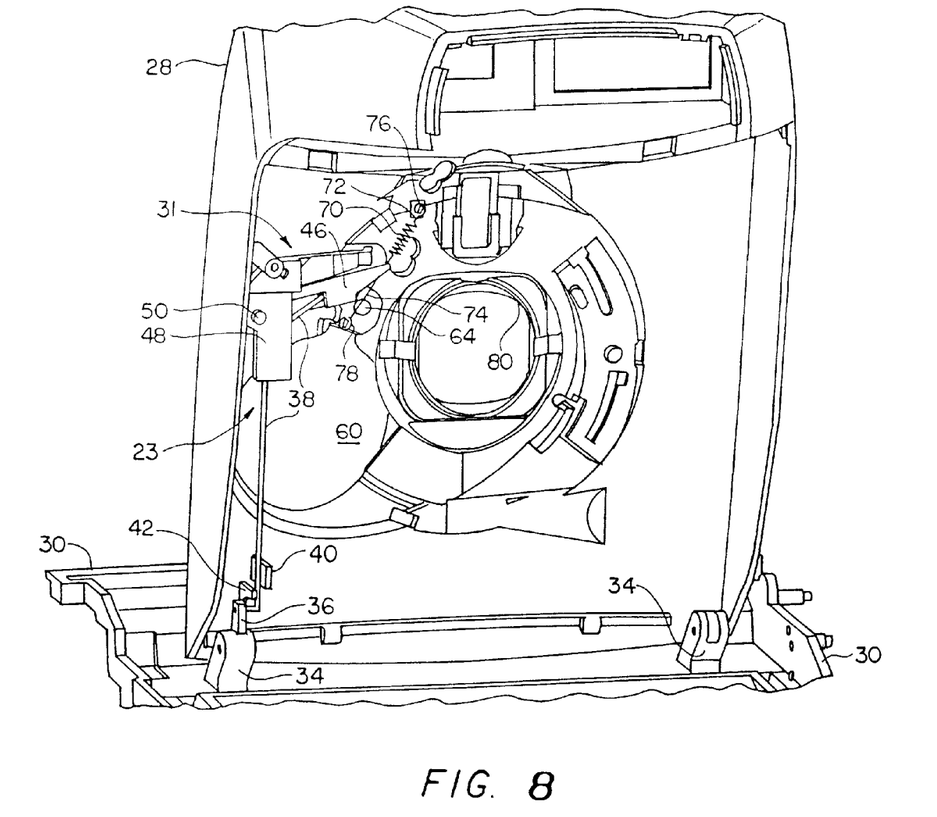
FIG. 8 is a perspective, generally rear view of the front cover of the camera and the lens cover assembly.

As shown in FIGS. 3 and 8, the main frame member 30 is provided with upstanding lugs 34 supporting a base link pivot pin 25 (FIG. 3) on which the base link 26 is pivotally mounted. On one of the lugs 34 there is fixed a post 36 in which is pivotally mounted an elongated push rod 38 which comprises a portion of the mechanical linkage 31 of the lens cover assembly 23 (FIGS. 3–5). The front cover 28 is provided with baffle plates 40, 42 for stabilizing the rod 38 (FIGS. 4, 5 and 8).

Figure 9:
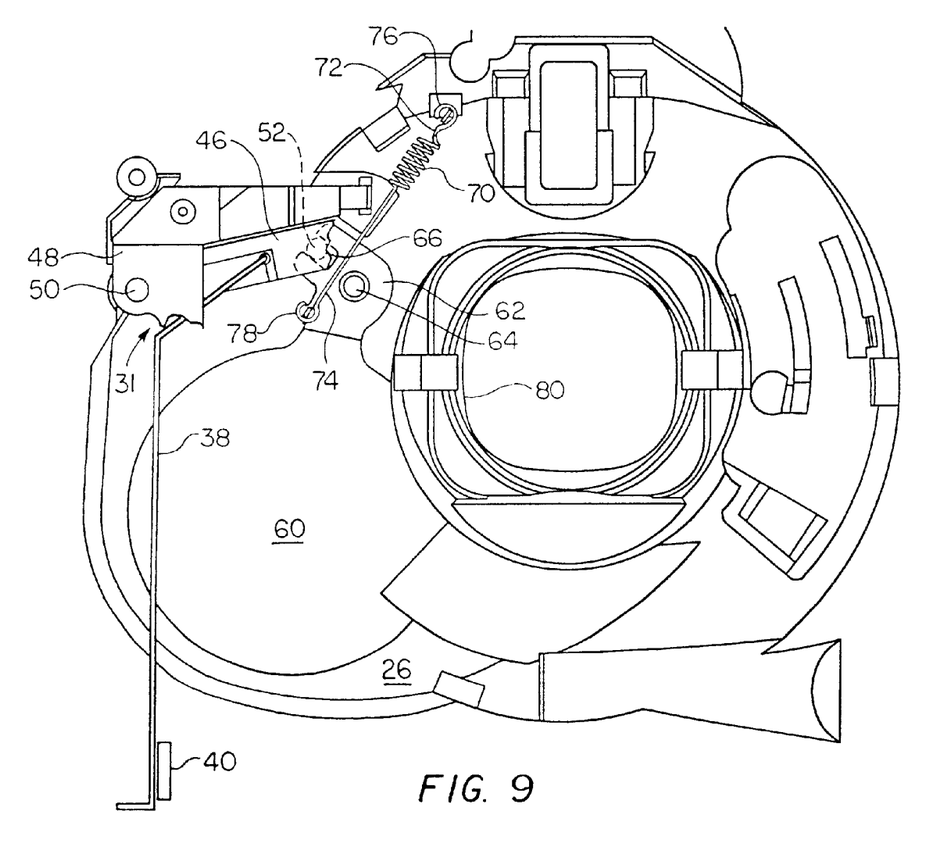
FIG. 9 is similar to FIG. 7, but shows the lens cover member and mechanical linkage in the open position.

An off-set upper end 44 of the rod 38 is pivotally attached to a lens cover link 46 which, in turn, is pivotally anchored to a lens cover support 48 at a link pivot 50. The lens cover link 46 is provided with a link pin 52 (FIGS. 6, 7 and 9).

A lens cover member 60 is provided with a pivot arm 62, which is pivotally mounted on the front cover 28 by a pivot pin 64, and which includes an open-ended slot 66. The link pin 52 is disposed in the slot 66.

Figure 6:
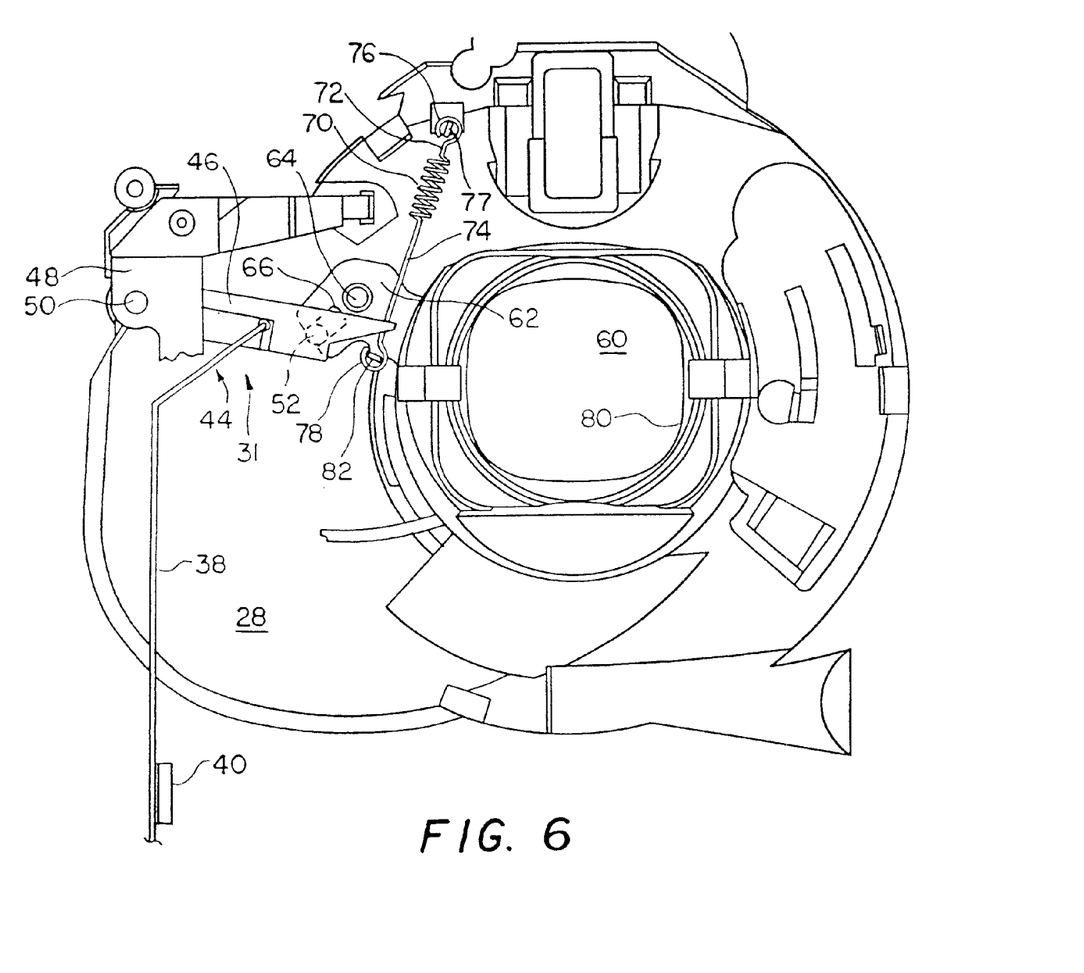
FIG. 6 is a rear elevational view, in part broken away, of the lens cover member and mechanical linkage therefor, the cover member being shown in a closed position.
Figure 7:
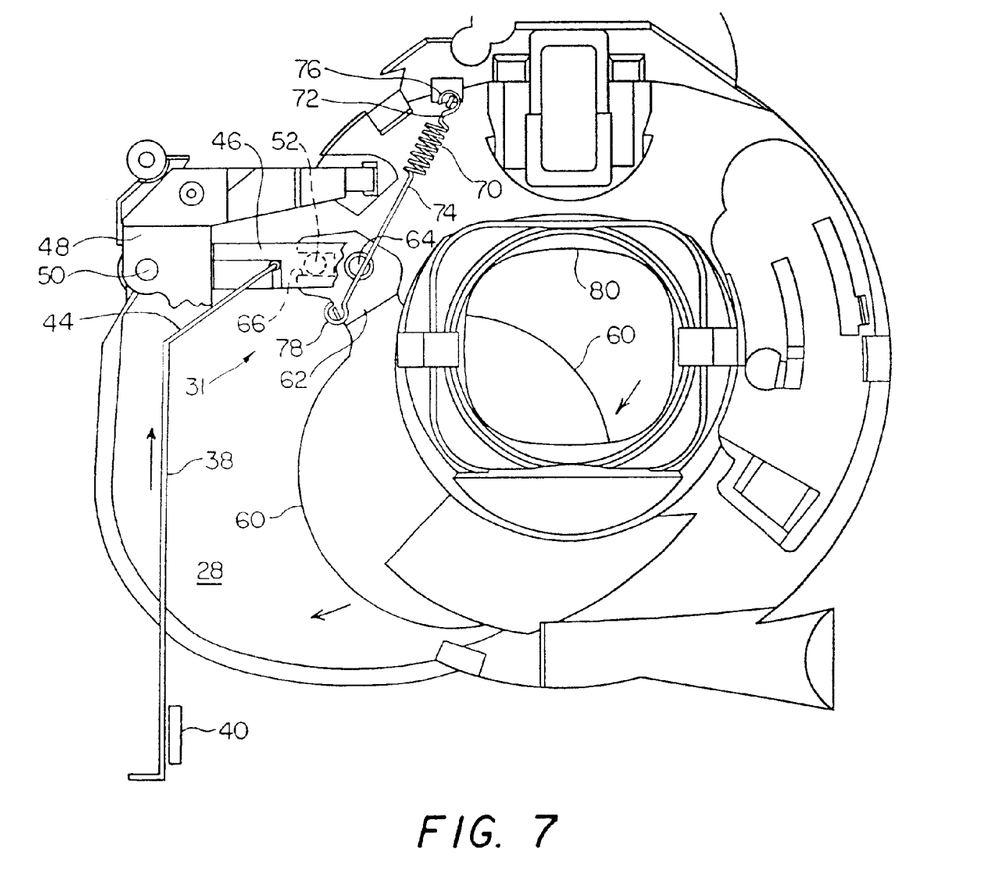
FIG. 7 is similar to FIG. 6, but shows the lens cover member and mechanical linkage in a half-way position between closed and open.

Referring to FIG. 6, it will be seen that a coil spring 70 interconnects a first wire 72 and a second wire 74. The first wire 72 is pivotally mounted on the front cover 28, as by a hook portion 76 being engaged with a front cover protrusion 77, and the second wire 74 is attached to the pivot arm portion 62 of the lens cover member 60, as by a hook portion 78 of the second wire 74 being engaged with a pivot arm protrusion 82. The spring 70 constitutes an "over the center" spring, further discussed hereinbelow.

In operation, and starting with the camera 20 disposed as shown in FIG. 1, that is, in the "closed" state, an operator "opens" the camera, by manually lifting the lens assembly 24 outwardly (upwardly as viewed in the drawings) from the main frame assembly 22, by pivoting the lens assembly, and more specifically, the base link portion 26 thereof, about the base link pivot pin 25 mounted on the lugs 34.

As the lens assembly 24 is pivoted outwardly, the push rod 38 pivots at the anchor end thereof in the post 36 and moves upwardly. The off-set rod upper end 44 begins to pivot the lens cover link 46 on the link pivot 50. The pivoting lens cover link 46 carries with it the link pin 52 fixed thereon, and causes rotative movement of the pivot arm 62 with which the lens cover link pin 52 is engaged.

The link pin 52 causes the lens cover pivot arm 62 to pivot on the pivot pin 64, to move the lens cover member 60 from the position shown in FIG. 6 to the position shown in FIG. 7, and thence to substantially the position shown in FIGS. 8 and 9.

As the movement of the lens cover pivot arm 62 carries the arm 62 from the position shown in FIG. 6 to the position shown in FIG. 7, the coil spring 70 stretches out to exercise a bias on the pivot arm 62. In further movement, to the position shown in FIG. 9, in which the spring second wire 74 has moved beyond the pivot pin 64, the spring 70 exercises an increased pull on the pivot arm 62 and snaps the arm 62, and thence the lens cover 60, into the fully open position, that is, a position in which all of the lens cover 60 is fully removed from a lens aperture 80.

Upon the operator's moving the lens assembly 24 back to the position shown in FIG. 1, the above-described mechanical linkage 31 operates in reverse. That is, the push rod 38 becomes a "pulling" rod, pulling the lens cover link 46 from the position shown in FIGS. 8 and 9, to the position shown in FIG. 7, and thence, to the position shown in FIG. 6. Upon the cover member pivot arm reaching a position proximate fully closed, the spring 70 operates to pull the pivot arm 62 upwardly, causing the cover member 60 to snap shut.

There is thus provided a lens cover assembly for a folding camera, which assembly is operative to automatically uncover the lens when the camera is opened, and cover the lens when the camera is closed.

It will be understood that many additional changes in the details, materials, and arrangement of parts, which have been herein described and illustrated in order to explain the nature of the invention, may be made by those skilled in the art within the principles and scope of the invention as expressed in the appended claims.

What is claimed is:

1. A lens cover assembly for a folding camera having a main frame assembly, and a lens assembly pivotally mounted on the main frame assembly and movable between a closed position in which the lens assembly is disposed at least in part within the main frame assembly and an open position in which the lens assembly upstands from the main frame assembly, the lens assembly having a lens and shutter unit therein, the lens cover assembly comprising:

a lens cover member pivotally mounted on the lens assembly and movable between a first position in which said lens cover member completely covers the lens, and a second position in which said lens cover member is removed from the lens; and a mechanical linkage interconnecting the main frame assembly and said lens cover member and operative, upon moving the lens assembly from the closed position to the open position, to move said lens cover member to the second position, and further operative, upon moving the lens assembly from the open position to the closed position, to move said lens cover member to the first position, said mechanical linkage comprising a post fixed to and upstanding from the main frame assembly, a push rod pivotally mounted at a first end thereof on said post, a second end of said rod being pivotally connected to a lens cover link, the lens cover link being engaged with said lens cover member to pivot said lens cover member on the lens assembly between the closed and open positions.

2. The lens cover assembly in accordance with claim 1, and further comprising at least one coil spring connected at a first end to the lens assembly and engaged at a second end with said lens cover member, said coil spring being operable to urge said lens cover member into the second position upon said lens cover member reaching a position proximate the second position.

3. The lens cover assembly in accordance with claim 2, wherein said coil spring is pivotally mounted at a first end on a front cover component of the lens assembly, and at a second end is attached to said lens cover member.

4. The lens cover assembly in accordance with claim 3, wherein said lens cover member is provided with a pivot arm portion which is pivotally mounted on the front cover, the pivot arm portion having a protrusion extending therefrom, the second end of the coil spring being attached to the protrusion.

5. The lens cover assembly in accordance with claim 1, wherein said post upstands from a main frame member of said main frame assembly, and said lens assembly includes a base link pivotally attached to said main frame member.

6. The lens cover assembly in accordance with claim 5, wherein the base link is pivotally attached to lugs upstanding from the main frame member, and said post upstands from one of the lugs.

7. The lens cover assembly in accordance with claim 1, wherein said lens cover link is pivotally mounted on a front cover component of the lens assembly.

8. The lens cover assembly in accordance with claim 7, wherein said lens cover member includes a pivot arm portion having a pivot pin therein by which the pivot arm portion is pivotally mounted on the front cover and said lens cover link is provided with a link pin engaged with said pivot arm portion to effect pivoting movement of the pivot arm portion, and thereby said lens cover member.

9. The lens cover assembly in accordance with claim 1, wherein said lens cover member is pivotally mounted on a front cover component of the lens assembly, and further comprises baffle plates extending from the front cover on either side of said push rod to stabilize said push rod.

10. A lens cover assembly for a folding camera having a main frame assembly and a lens assembly pivotally mounted on the main frame assembly and movable thereon between a closed position in which the lens assembly is disposed at least in part in the main frame assembly and an open position in which the lens assembly upstands from the main frame assembly, the lens assembly having a lens therein, the lens cover assembly comprising:

a lens cover member mounted on the lens assembly and movable between a first position in which said lens cover member completely covers the lens, and a second position in which said lens cover member is removed from the lens; and a lens cover member moving means disposed at least in part on the lens assembly and at least in part on the main frame assembly and operative, upon moving the lens assembly from the closed position to the open position, to move said lens cover member from the first position to the second position, and upon moving the lens assembly from the open position to the closed position, to move said lens cover member from the second position to the first position, said lens cover member moving means comprising first moving means for moving said lens cover member from the first position to proximate the second position, and for moving said lens cover member from the second position to proximate the first position; and second moving means for moving said lens cover member from proximate the second position to the second position, and from proximate the first position to the first position;

wherein said second moving means comprises a spring for urging said lens cover member from proximate the second position to the second position and for urging said lens cover member from proximate the first position to the first position;

and wherein said spring comprises a coil spring pivotally mounted at a first end thereof on the lens assembly and pivotally connected at a second end thereof to said lens cover member.

11. The lens cover assembly in accordance with claim 10, wherein said lens cover member is pivotally mounted in the lens assembly and is pivotally movable between the first and second positions.

12. The lens cover assembly in accordance with claim 10, wherein said first moving means comprises a mechanical linkage interconnecting said lens cover member and the main frame assembly.

13. The lens cover assembly in accordance with claim 12, wherein said mechanical linkage comprises a push rod connected at a first end to a main frame member of the main frame assembly and connected at a second end to a lens cover link connected to said lens cover member, such that changing the camera between the open and closed positions causes movement of said push rod, and thereby the lens cover link, and thereby said lens cover member.

14. The lens cover assembly in accordance with claim 13, wherein said lens cover member includes a pivot arm portion pivotally mounted in the lens assembly, and said lens cover link is pivotally mounted in the lens assembly and is in engagement with the lens cover member pivot arm portion, such that movement of said push rod in response to changing the camera between the open and closed positions, causes pivotal movement of the lens cover link, causing pivotal movement of the lens cover member pivot arm portion, causing movement of the lens cover member.

15. The lens cover assembly in accordance with claim 14 wherein said push rod is pivotally mounted at a first end thereof in the main frame member and is pivotally connected at the second end thereof to the lens cover link.

16. The lens cover assembly in accordance with claim 12 wherein said lens cover member includes a pivot arm portion pivotally mounted in the lens assembly and the coil spring second end is connected to the lens cover member pivot arm position.

* * * * *